United States Patent [19]

Jesinger

[11] Patent Number: 4,764,085
[45] Date of Patent: Aug. 16, 1988

[54] BLOWER FOR CIRCULATING LARGER GAS VOLUMES, IN PARTICULAR FOR HIGH-POWER LASER SYSTEMS OPERATING ACCORDING TO THE GAS-TRANSPORTATION PRINCIPLE

[75] Inventor: Richard Jesinger, Esslingen, Fed. Rep. of Germany

[73] Assignee: Fortuna-Werke Maschinenfabrik GmbH, Stuttgart, Fed. Rep. of Germany

[21] Appl. No.: 946,513

[22] Filed: Dec. 24, 1986

[30] Foreign Application Priority Data

Jan. 4, 1986 [DE] Fed. Rep. of Germany ....... 3600124

[51] Int. Cl.$^4$ .............................................. F04D 29/10
[52] U.S. Cl. ................................. 415/112; 415/170 R; 415/175; 384/114; 384/123; 310/90.5
[58] Field of Search ............... 415/110, 111, 112, 113, 415/170 R, 175, 176; 384/107, 111, 112, 113, 114, 123, 378; 310/90.5

[56] References Cited

U.S. PATENT DOCUMENTS

| | | | |
|---|---|---|---|
| 3,022,935 | 2/1962 | Frost | 417/370 |
| 3,105,631 | 10/1963 | Hanny | 415/175 |
| 3,731,984 | 5/1973 | Habermann | 308/10 |
| 3,837,716 | 9/1974 | Allen et al. | 384/112 |
| 3,933,416 | 1/1976 | Donelian | 415/112 |
| 3,951,573 | 4/1976 | Dunning et al. | 417/424 |
| 3,955,860 | 5/1976 | Menke et al. | 415/169 A |
| 3,969,042 | 7/1976 | Bachler | 415/112 |
| 4,312,628 | 1/1982 | Yamamura | 310/90.5 |

FOREIGN PATENT DOCUMENTS

| | | |
|---|---|---|
| 2315093 | 3/1973 | Fed. Rep. of Germany . |
| 3245958 | 12/1982 | Fed. Rep. of Germany . |
| 3245959 | 12/1982 | Fed. Rep. of Germany . |
| 2161180 | 7/1973 | France . |
| 5518 | 1/1983 | Japan .................................... 384/107 |
| 50320 | 3/1983 | Japan .................................... 384/123 |
| 134219 | 8/1983 | Japan .................................... 384/123 |
| 423075 | 4/1967 | Switzerland . |
| 301931 | 1/1929 | United Kingdom . |
| 790009 | 1/1958 | United Kingdom . |
| 1222275 | 2/1971 | United Kingdom ................. 384/112 |
| 2130655 | 6/1984 | United Kingdom . |

Primary Examiner—Robert E. Garrett
Assistant Examiner—John T. Kwon
Attorney, Agent, or Firm—Majestic, Gallagher, Parsons & Siebert

[57] ABSTRACT

A blower serves for circulating larger gas volumes, in particular for high-power laser systems operating according to the gas-transportation principle. The blower comprises a radial compressor, having a compressor element extending into a connection duct to blow a gas from a first to a second gas duct. The radial compressor is driven by a vertical shaft which is provided with an axial and radial gas bearing within a gas-tight housing. A gas duct system is provided for supplying lubricating gas to both the axial and the radial gas bearings. The gas duct system is fed by both one of the axial gas bearings and by an external pressure-gas pump. Throttles and adjustable valves are provided at predetermined locations of the gas duct system to establish a predetermined profile of gas pressure in the duct system.

5 Claims, 3 Drawing Sheets

BLOWER FOR CIRCULATING LARGER GAS VOLUMES, IN PARTICULAR FOR HIGH-POWER LASER SYSTEMS OPERATING ACCORDING TO THE GAS-TRANSPORTATION PRINCIPLE

The present invention relates to a blower for circulating larger gas volumes, in particular for high-power Laser systems operating according to the gas-transportion principle, comprising a radial feeder arranged in a connection between two gas ducts of a gas transportation portion, and comprising further a drive portion provided with a shaft which is connected with the radial feeder to rotate therewith, which is seated axially and radially in a pressure-tight housing and which is provided with a drive, one lower face of the radial feeder, one upper face of the housing, a first gas chamber arranged therebetween and an arrangement of spiral grooves forming an axial spiral flute bearing, the shaft being guided tightly in an opening of the housing immediately below the axial spiral flute bearing and provided at this point with a first air-type radial prvot bearing, the opening ending in a second gas chamber which is passed by the shaft and in which the shaft is provided with drive elements, the end of the shaft opposite the radial feeder being guided tightly in a blind bore, which is aligned with the said opening, and provided at this point with a second air-type radial pivot bearing, and a third gas chamber being provided between the free end of the shaft and the base of the blind bore which accommodates means for supporting the shaft in the axial direction.

A blower of this type has been known before from the U.S. Pat. No. 3,951,573.

The axial spiral flute bearing is formed in the known blower by a flange plate provided at the bottom face of the radial feeder and rotating with the latter, the face of this plate pointing away from the radial feeder forming a radial annular surface. A pressure plate fixed to the housing is arranged at a small distance opposite the said radial annular surface and provided with spiral grooves distributed over its periphery. The gas pressure produced by this axial spiral flute bearing serves substantially to support the radial feeder in the axial direction. In addition, the pressure serves, however, also to supply the necessary gas pressure for two air-type radial pivot bearings, one of which is arranged immediately below the radial feeder while the other one is arranged at the free end of the shaft. The shaft rotates in a cylindrical, gas-tight housing. Between the two air-type radial pivot bearings, a winding serving as a drive element and co-acting with stator windings fixed to the housing is applied upon a shaft section of reduced diameter. The gas pressure produced by the axial spiral flute bearing finally also serves to act upon the radial end face of the free end of the shaft so as to increase the axial supporting force still further.

In order to facilitate starting of the known blower, the free end of the shaft is provided with supporting means which can be adjusted by means of an axial screw and by means of which a rod, the upper end of which carries a ball, can be screwed into the area of the shaft. When the rod is screwed in, the ball comes to rest against a conical bearing face provided in the radial end face at the free end of the shaft so that the shaft and, thus, the radial feeder, can be lifted off axially by screwing in the rod. Once the shaft has reached its rated speed and the pressure prevailing in the axial spiral flute bearing is sufficient to carry the shaft, the rigid support at the lower end of the shaft is no longer necessary, and the rod is screwed back into the housing, whereby the ball is brought out of contact with the conical bearing face.

In the case of the known blower, the shaft as a whole rotates in a closed blind bore which means that the pressure distribution prevailing in this blind bore is largely unalterable and uncontrolled. Similarly, no controlled gas flow is obtained within the blind bore. If, according to one variant of the known blower, even part of the wall of the blind bore is removed so that compressed gas is permitted to flow from the blind bore into the open air, it is not even possible to supply the lower air-type radial pivot bearing with the necessary compressed air, and no axial support can be provided by the gas pressure, either.

German Disclosure Document No. 32 45 959 describes a radial blower serving to circulate the gas of a Laser operating according to the gas-transportation principle, for example $CO_2$ or an $N_2/He$ mixture, between an excitation section and a cooling section. As is generally known, it is a fact with such Lasers that certain performance data decrease as the temperature of the Laser gas rises. The known arrangement is, therefore, to ensure that the gas temperature can be kept continuously at a sufficiently low level by circulating the gas continuously between an excitation section and a heat exchanger.

If the known arrangement is to be used in connection with high-power Lasers with very high power outputs, then it is necessary to circulate the gas in the Laser at delivery rates of several thousands or ten thousands of cubic meters per hour. This requires rotary speeds of the radial feeder of several ten thousands to hundred thousands revolutions per minute, which leads on the other hand to circumferential speeds of the radial feeder of over 600 meters per second and requires drive powers in the range of several 10 KW.

In the case of the blower known from German Disclosure Document No. 32 45 959, no information is provided as to how the radial feeder is to be driven.

The blower known from U.S. Pat. No. 3,951,573 is, however, also not suited for this application because the bearing described in this case does not suffice to meet the very high demands which must be fulfilled in the before-mentioned speed range. This is true in particular when part of the cylindrical wall of the blind bore is removed in the case of the known blower, because in this case the bearing characteristics which are undispensable for high speeds can no longer be guarantied.

Now, it is the object of the present invention to improve a blower of the type described above in such a manner that the bearing characteristics are further improved, in particular rendered reproducible, so that speeds of up to several thousand revolutions per minute can be reached, which speeds are required for applications in connection with high-power Lasers.

According to the present invention, this object is achieved by an arrangement in which the lower face of the radial feeder is provided with the spiral grooves, a first channel connects the first gas chamber with the second gas chamber, a second channel connects the second gas chamber with the third gas chamber and a discharge channel leads from the second gas chamber into the open air.

The object underlying the present invention is solved in this manner because a defined and adjustable gas flow is achieved between the bearings by means of the channels and the before-mentioned chambers. In particular, gas-scavenging of the bearings is ensured in this manner because the bearing faces are passed at any time by a certain gas flow, while in the case of the known blower an increase or reduction of pressure is encountered only in the blind bore (provided its wall has not been opened) without any gas masses being circulated therein.

However, by sizing the channels in a suitable manner, it is possible in the case of the arrangement according to the invention to supply the air-type radial pivot bearings at any time—even when rotating at different speeds—with the required gas volume, and the axial supporting effect on the free end of the shaft which acts as a piston can also be adjusted in a reproducible manner, depending on the operating conditions or according to the sizing of the remaining blower elements.

According to a preferred embodiment of the invention, an adjustable throttle is arranged in the discharge channel.

This feature also serves to permit the reproducible adjustment of the gas flow in the manner described before.

According to a further embodiment of the invention, a compressed-gas pump is connected to the third gas chamber, and a throttle is arranged in the second channel.

This feature provides the advantage that additional pressure can be generated by means of the compressed-gas pump—during the starting phase of the blower, or during continuous operation thereof—which additional pressure may benefit both the air-type radial pivot bearings and the axial air-cushion support of the shaft. The throttle in the second channel and/or the throttle in the discharge channel in turn permit defined pressure and flow conditions to be adjusted for the different bearing points.

According to another preferred embodiment of the invention, the compressed-gas pump is operated with a gas which is identical with the gas delivered by the blower. It is true that this feature has been known before from German Laid-Open Patent Application No. 23 15 093, but here self-lubricating gas bearings are used so that the use of a gas identical to the transporting gas suggests itself as a matter of course.

According to a further embodiment of the invention, an additional axial supporting force is provided for the shaft in the form of a magnetic force.

This feature provides the advantage to permit the supporting force to be set rapidly, and setting the force by means of a magnet offers the additional advantage that no mechanically moved elements are required.

However, this feature has been known before from U.S. Pat. No. 3,731,984—though not in connection with an air-cushioned shaft.

According to a preferred improvement of this variant, the lower end of the shaft is provided with magnetized zones, and an electromagnet is arranged in the housing below the end of the shaft. The electromagnet consists preferably of a permanent magnet attracting the lower end of the shaft, and an excitation winding weakening the effect of the permanent magnet.

This feature offers the advantage that the excitation winding has to be switched on only when the blower rotates at low speeds, as for example during starting and running-out phases, to prevent the shaft from being drawn axially downwardly during this operating condition. A substantial, upwardly directed suction force acting on the radial feeder, and also an upwardly directed axial bearing force of the axial spiral flute bearing, are encountered only when higher speeds are reached. These two upwardly directed forces may then be compensated by the effect of the permanent magnet, the action of which can be released continuously or in steps by switching off the excitation winding.

Other advantages of the invention will become apparent from the following description and the attached drawing.

It is understood that the features that have been described before and that will be explained hereafter, can be used not only in the described combinations, but also in other combinations or individually, without leaving the scope of the present invention.

In particular, it is understood that the described application for Lasers operating according to the gas-transportation principle is to be regarded as an example only and that the blower according to the invention can of course be used also in numerous other applications where gas throughputs at high delivery rates are required for industrial production processes.

Certain embodiments of the invention are illustrated in the drawing and will be described hereafter with reference to the drawing, in which FIG. 1 is an overall diagrammatic representation of a blower according to the invention, with its pressure fluid circuits;

Figure 1:
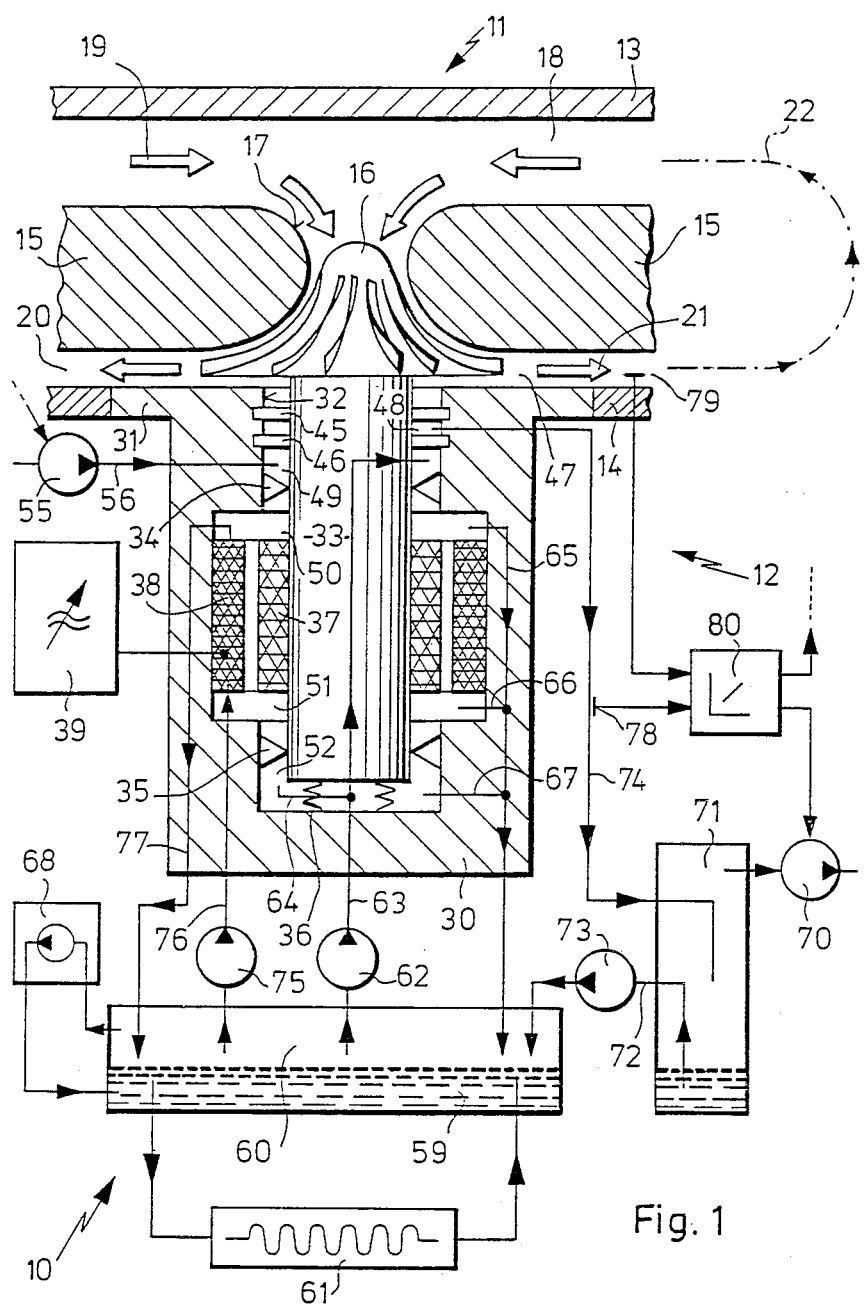

In FIG. 1, one embodiment of a blower according to the invention is designated generally by reference numeral 10. The blower 10 consists roughly of a gas feeding portion 11 and a drive portion 12.

The gas transportation portion 11 comprises all elements required for transporting and guiding the gas. There are provided to this end, between an upper limiting wall 13 and a lower limiting wall 14, guiding and separating elements 15 leaving between them a connection passage accommodating a radial feeder 16. The surface contour 17 of the guiding and separating elements 15 is adapted to the associated surface contour of the radial feeder 16.

The gas transportation portion 11 thus comprises an upper gas duct 18 through which a gas, for example an inert gas mixture, can flow in the direction indicated by the arrows 19, and a lower gas duct 20 through which the gas flows in the direction indicated by the arrows 21. The gas ducts 18, 20 meet in the area of additional deflection elements as indicated by the line 22 in FIG. 1.

When the blower 10 according to the invention is used, for example, in connection with a high-power Laser, the upper gas duct 18 may form the excitation section, while the lower gas duct 20 may conveniently comprise one or more heat exchangers for cooling the recirculated gas.

It is further understood that the direction of the arrows 19, 21 as indicated in the drawing may also be reversed if the blades of the radial feeder 16 are sized accordingly. Further, it is also stressed once more that the application in connection with Lasers operating according to the gas-transportation principle is to be regarded only as an example used for illustration purposes and that the invention is by no mean limited to this application.

The drive portion 12 comprises substantially a cylindrical housing 30 ending at its upper end in an annular flange 31 which may be integrated into or welded to the lower limiting wall 14.

The annular flange 31 is provided at its center with an opening 32 which is passed by a shaft 33 on which the radial feeder 16 is mounted to rotate therewith.

The shaft 33 is seated in an upper radial bearing 34 and a lower radial bearing 35, with a resilient support 36 being provided between its lower end and the housing 30.

It is to be noted in this connection that the terms "upper" and "lower" as used in the present context are to be understood only as an example, as are the representations of the different figures. The blower according to the invention may of course be installed also in horizontal or reverse position without leaving the scope of the invention.

The shaft 33 is provided with a rotor winding 37 arranged between the radial bearings 34 and 35. A stator winding 38 is arranged opposite the rotor winding 37 at the housing 30. The stator winding 38 is connected with a supply unit 39 which generates an electric supply voltage of suitable amplitude and frequency, in particular of variable frequency. The supply unit 39 has, typically, a power output of 50 KW, the output frequency being adjustable between 700 and 3000 Hz.

The supply unit 39 comprises further evaluation units—which are not shown in the drawing for the sake of clarity—for monitoring the lubricating-oil temperature, the lubricating-oil quantity and the power consumption, as well as a detection circuit for bearing defects, and the like. All theses units are, however, known as such so that they need not be described in detail in connection with the present invention.

There can be seen in the drawing above the upper radial bearing 34, but below the opening 32, an upper seal 45 and a lower seal 46. These seals 40, 46 acting in the axial direction of the shaft 33 define a pump chamber 47 above the upper seal 45 which communicates with the lower gas duct 20, and further a lock chamber 48 between the seals 45, 46, and a first drive chamber 49 between the lower seal 46 and the uppe radial bearing 34.

For the purposes of the present description, the chamber between the upper radial bearing 34 and the rotor winding 37 and/or the stator winding 38 is designated as second drive chamber 50, while the chamber between the rotor winding 37 and/or the stator winding 38 and the lower radial bearing 35 is designated as third drive chamber 51, and the chamber below the lower radial bearing 35, which accommodates also the resilient support 36, is designated as fourth drive chamber 52.

Different pressure fluid circuits are connected to the drive portion 12 of the blower 10.

A compressed-air pump 55 or a usual compressed-air unit is connected with the first drive chamber 49 via a compressed-air line 56.

An oil pan 60 contains oil 59 intended for lubricating and cooling the different bearing and drive elements. The oil pan 60 is connected to a heat exchanger 61 in order to keep the temperature of the oil continuously at a pre-determined low level.

A lubricating-oil pump 62 delivers oil 59 from the oil pan 60 into a first lubricating-oil line 63 passing through the housing 30 in the direction of the axis of the shaft 33. The first lubricating-oil line 63 then passes through the shaft 33 at first axially and then radially outwardly, ending finally in the first drive chamber 49.

A second lubricating-oil line 64 branches off the first lubricating-oil line 63 in the fourth drive chamber 52 and serves for supplying oil directly to the lower radial bearing 35.

A third lubricating-oil line 65 departs from the second drive chamber 50, is joined by a fourth lubricating-oil line 66 arriving from the third drive chamber 51 and a fifth lubricating-oil line 67 arriving from the fourth drive chamber 52 and leads finally back into the oil pan 60.

The oil 59 may contain a quantity of liquifiable gas, for example freon. The oil containing the admixture of liquified freon is supplied to the different cooling and lubricating points where the freon vaporizes due to the temperature prevailing at these points so that the cooling process is further supported by the cold resulting from the evaporation process.

The freon in the gaseous phase is then returned to the oil pan 60 where it is drawn off and supplied to a condenser 68 which condenses it until it assumes again its liquid phase, whereafter the liquified freon is admixed again to the oil 59.

There is further provided a vacuum pump 70 which is preceded by an oil separator 71. An oil return line 72 leads from the oil sump of the oil separator 71 into the oil pan 60, via a return oil pump 73.

The input of the oil separator 71 is connected with a suction line 74 leading to the lock chamber 78.

There is further provided a cooling-oil pump 75 delivering oil 59 from the oil pan 60 to a first cooling-oil line 76 which leads into the area of the stator winding 38 to cool the latter. A second cooling-oil line 77 leads from this point back to the oil pan 60.

Finally, a first pressure sensor 78 and a second pressure sensor 79, which are actively connected with a controller 80, are provided on the suction line 74 and on the pump chamber 47, respectively. The output of the controller 80 is connected to control inputs of the vacuum pump 70 and the compressed-air pump 55, respectively. In addition, the controller 80 may also be connected to the vacuum pump of the Laser if the blower 10 according to the invention is used in connection with a Laser.

The function of the blower 10, as described with reference to FIG. 1, is as follows:

The blower 10 can be started up by corresponding adjustment of the supply unit 39, in particular of the latter's output frequency and power output. As long as the low speeds normally encountered during the starting-up phase of the blower prevail, the pressure encountered in the pump chamber 47 is relatively low. Sensors 78, 79 pick up this pressure, just as the pressure prevailing in the lock chamber 48, and cause the vacuum pump 70 to be set in such a manner that a defined pressure drop is encountered across the upper seal 45. In addition, the compressed-air pump 55 is set in such a manner that the lubricant pressure prevailing in the first drive chamber 49 is adjusted to a pressure corresponding to the two before-mentioned pressures.

As can be seen clearly in FIG. 1, the shaft 33 is seated in a "floating" manner because the drive elements, which are symbolized in the present case by the rotor winding 37 and the stator winding 38, are arranged between the radial bearings 34, 35. The axial support of the shaft 33 is realized on the one hand by a resilient support 36 at the lower end of the shaft 33 and, on the other hand, by suitable adjustment of the pressure in the pump chamber 47.

The blower 10 is operated preferably in such a manner that the rated speed is in the supercritical range, i.e. in the range above the natural resonance of the movable system.

When the rated speed is reached, all lubricating, oil and other pressure fluid systems are in the balanced condition.

Figure 2:
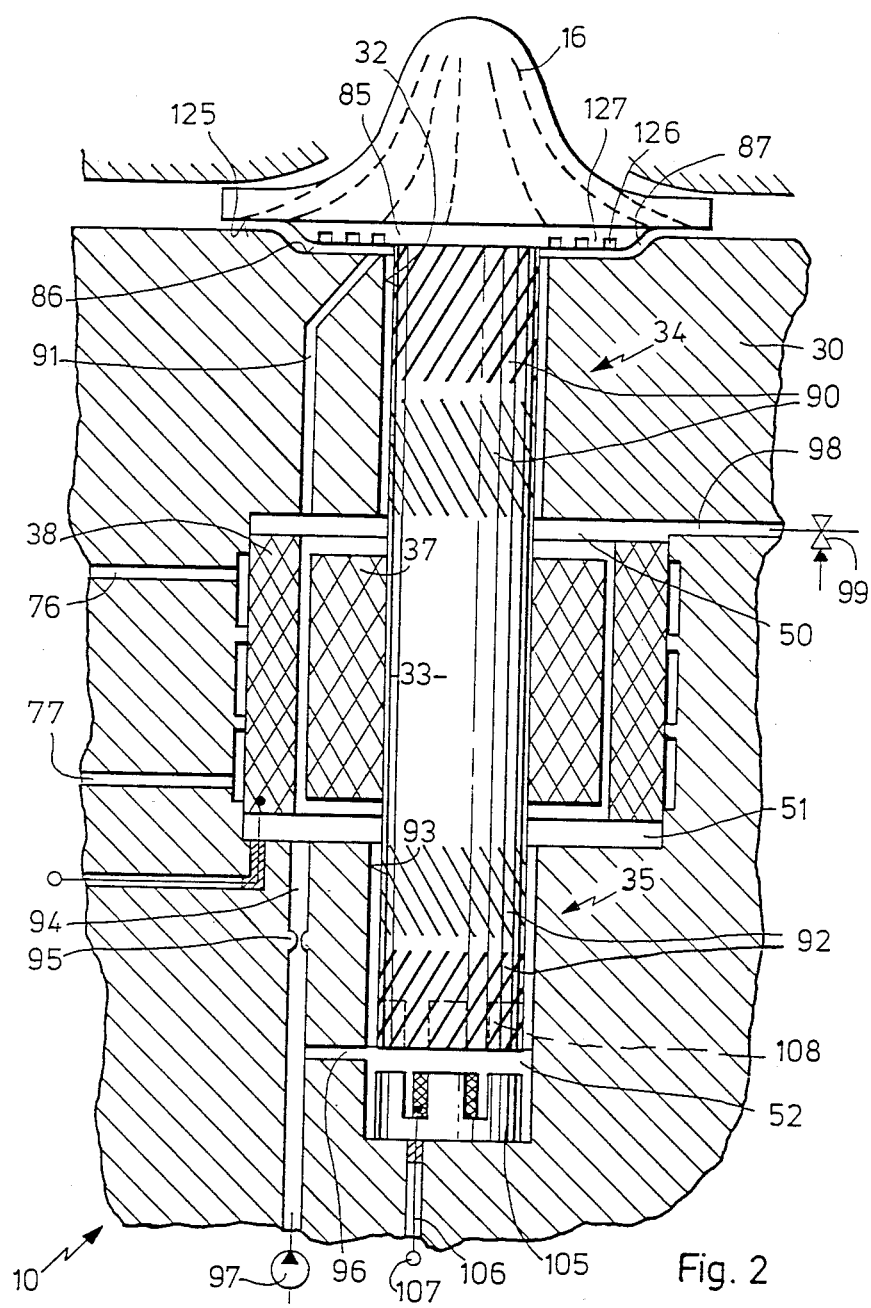
FIG. 2 is an enlarged representation of the mechanical details of the drive of a blower similar to that shown in FIG. 1, but equipped with air cushions.

FIG. 2 shows further details of the blower 10 similar to that shown in FIG. 1, but with air bearings.

The radial feeder 16, as shown in FIG. 2, carries on its upside 125 an axial projection 85 fitting into a matching recess 86 provided in the upside of the housing 30. Accordingly, a narrow annular space 87 is formed between the projection 85 and the recess 86.

The shaft 33 is provided in its upper area adjacent the radial feeder 16 with an upper herringbone air bearing 90 comprising two areas of inclined grooves which are axially offset relative to each other in the conventional manner. A first channel 91 is arranged to by-pass the upper herringbone air bearing 90, leading first away from the corner between the space 87 and the opening 32, extending thereafter parallel to the axis of the shaft 33 and ending finally in the second drive space 50.

The lower end of the shaft 33 is provided with a lower herringbone air bearing 92 designed analogously to the upper herringbone air bearing 90. The lower herringbone air bearing 92 runs in an axial bore 93 of the-housing 30. A second channel 94 accommodating a throttle 95 is arranged to by-pass the lower herringbone air bearing 92, leading first axially downwardly from the third drive chamber 51 and then, through an open feeder, to the fourth drive chamber 52. The second channel 94 extends beyond the connection point of the open feeder 96 in the axial direction and is connected to a second compressed-air pump 97. In addition, the discharge channel 98 leads from the second drive chamber 50 to the open air via an adjustable throttle 99. The term "air" may be interpreted for the purposes of the present description also as referring to any gas or any mixture.

The bore 93 is a blind bore and accommodates at its base an electromagnet 105 which is connected with a socket 107 via a connection line 106. The pole end faces of the electromagnet 105 are faced by magnetized zones 108 provided on the lower end of the shaft 33.

Figure 3:
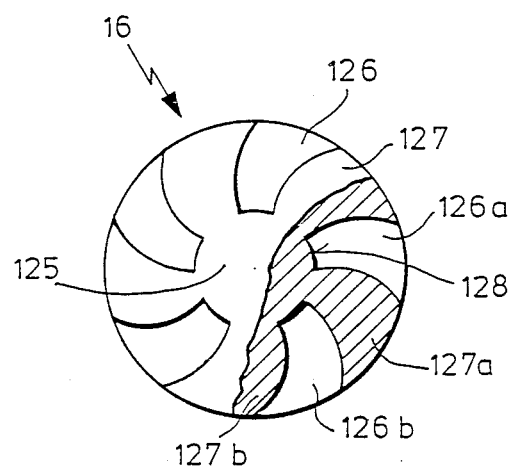
FIG. 3 is a bottom view of a radial feeder, drawn in the scale of FIG. 1.

As can be seen in particular in FIG. 3, the lower face 125 of the radial feeder 16 is provided with spiral grooves 126, 126a, 126b . . . with corresponding webs 127, 127a, 127b . . . arranged therebetween. The inner ends of the spiral grooves 126 end a certain distance 128 from the rotary axis of the radial feeder 16. It is understood that the spiral grooves 126 as shown in FIGS. 2 and 3 are not true to scale, their depth being only in the range of one hundredth of a millimeter, preferably only a few μ.

The operation of the arrangement according to FIGS. 2 and 3 is as follows:

The spiral grooves 126 provided on the bottom face 125 of the radial feeder 16 serve a dual purpose if the shaft 33 rotates at corresponding speeds. On the one hand, they serve as an axial bearing for the shaft 33 and the radial feeder 16 fitted thereon, while on the other hand they also act as a pump for the herringbone air bearings 90 and 92 serving as radial bearings.

In one practical embodiment of the invention, the axial spiral flute bearing formed by the spiral groove 126 doubles the pressure of, say, 100 mbar, arriving from the pump chamber 47 so that the carrying capacity of the bearings is also doubled.

If no second compressed-air pump 97 is provided, the lower herringbone air bearing 92 is also supplied with air from the pump formed by the spiral grooves 126, via the first channel 91 and the second channel 94.

The lower end of the shaft 33 running in the bore 93 acts like a pump plunger.

It is, therefore, possible, according to a variant of the invention, to pressurize the fourth drive chamber 52 in a controlled manner and, accordingly, to load and unload the shaft 33 in the axial direction. This is of particular importance during starting and running-out of the blower 10.

It must be reminded in this connection that during operation it is substantially three axially acting forces that act upon the shaft 33 with the radial feeder 16 fitted thereon.

Firstly, the radial feeder 16 is subjected to upwardly directed suction forces. And the force of the axial bearing formed by the spiral grooves 126 also acts upwardly in axial direction, while the downwardly directed force of the weight acts in the opposite sense.

When the rotary speed is zero, only the force of the weight is active. However, relatively small speeds already suffice to lift the shaft 33 and the radial feeder 16, as a result of the upwardly directed axial bearing force and the suction force, and these two latter forces become more and more predominant as the speed rises.

It is, therefore, necessary to provide an additional downwardly directed force for higher speeds and/or to activate an upwardly directed supporting force as long as the speeds are very low, which force may then be dispensed with as the speeds rise.

This can be achieved on the one hand by causing the second compressed-air pump 97 to produce overpressure conditions in the fourth drive chamber 52 when the speeds are very low. The overpressure is the product of a flow rate and the throttle 95, the flow rate being preselectable by means of the adjustable throttle 99.

According to a variant of the invention, it is, however, also possible to make use of the electromagnet 105 and the magnetized zones 108 on the lower end of the shaft 33.

The electromagnet 105 is designed as a permanent magnet which is provided with an excitation winding permitting the force of the permanent magnet to be weakened. The polarity of the permanent magnet on the one hand and of the zones 108 on the other hand is selected in such a manner that the lower end of the shaft 33 is attracted by the permanent magnet.

As long as the shaft 33 does not rotate at all or at low speeds, the magnet winding is excited so that the force of the permanent magnet is compensated. Accordingly, the shaft 33 is not loaded axially downwardly at these low speeds. Only when higher speeds are reached is the excitation winding de-energized, and the attractive force exerted by the permanent magnet on the zones 108 draws the shaft 33 downwardly thereby compensating the axial bearing force and the suction force.

I claim:

1. A blower for circulating large gas volumes, in particular for high-power laser systems of the gas-transportation type, comprising:
    gas transportation means having a first and a second gas duct for receiving and guiding said gas under circulation, said gas ducts being interconnected by a connection duct;

a radial compressor being rotatable about a vertical axis and having an upper compressor element extending into said connection duct to blow said gas from said first to said second gas duct and having further a flat lower surface, said surface being provided with spiral grooves;

a pressure-tight housing block arranged below said gas transportation means and having a flat upper surface opposite said flat lower surface and being surrounded by an atmosphere;

a cavity arranged in said housing block;

a vertical bore extending from said flat upper surface through said cavity and ending in a lower blind bore, said blind bore being terminated by a bottom;

a vertical drive shaft rigidly connected with said radial compressor and said flat lower surface to rotate therewith, said shaft being received in said bore and having a lower end extending into said blind bore and having a predetermined distance from said bottom;

a first gas chamber being formed between said flat lower surface and said flat upper surface under the action of said spiral grooves when said compressor is rotated, thus serving as an axial spiral flute bearing;

a first air-type radial bearing arranged in said bore adjacent said flat upper surface to tightly and radially bear said shaft between said flat upper surface and said cavity;

a second air-type radial bearing arranged in said blind bore adjacent said cavity to tightly and radially bear said shaft between said cavity and said lower end, thus defining a second gas chamber between said first and second radial bearings and further defining a third gas chamber between said second bearing and said bottom;

drive elements arranged in said cavity to rotatably drive said shaft;

axial supporting means arranged in said third gas chamber to axially support said shaft;

a first channel connecting said first gas chamber with said second gas chamber;

a second channel connecting said second gas chamber with said third gas chamber;

a throttle arranged in said second channel;

a pressure-gas pump connected to said second channel between said throttle and said third gas chamber;

a discharge channel connecting said second gas chamber to said atmosphere; and an adjustable throttle being arranged in said discharge channel.

2. The blower according to claim 1, wherein said pressure-gas pump is operated with a gas which is identical to the gas transported by said blower.

3. The blower according to claim 1, wherein a resilient axial supporting force is applied to said shaft in the form of a magnetic force.

4. The blower according to claim 3, wherein said lower end of said shaft is provided with magnitized zones and an electromagnet is arranged in said housing below said lower end of said shaft.

5. The blower according to claim 4, wherein said electromagnet consists of a permanent magnet attracting said lower end of said shaft, with an excitation winding weakening the effect of said permanent magnet.

* * * * *